US011531896B2

(12) United States Patent
Nakamura et al.

(10) Patent No.: US 11,531,896 B2
(45) Date of Patent: Dec. 20, 2022

(54) NEURAL NETWORK CIRCUIT PROVIDING FOR OPERATIONS WITH BIT SHIFTING AND ROUNDED VALUES OF WEIGHT INFORMATION

(71) Applicant: Hitachi, Ltd., Tokyo (JP)

(72) Inventors: Toshiaki Nakamura, Tokyo (JP); Teppei Hirotsu, Tokyo (JP); Tatsuya Horiguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 813 days.

(21) Appl. No.: 16/470,633

(22) PCT Filed: Jan. 10, 2017

(86) PCT No.: PCT/JP2017/000367
§ 371 (c)(1),
(2) Date: Jun. 18, 2019

(87) PCT Pub. No.: WO2018/131059
PCT Pub. Date: Jul. 19, 2018

(65) Prior Publication Data
US 2019/0325311 A1    Oct. 24, 2019

(51) Int. Cl.
*G06N 3/063* (2006.01)
*G06F 12/1009* (2016.01)
*G06N 3/08* (2006.01)
*G06F 17/11* (2006.01)
*G06N 3/04* (2006.01)

(52) U.S. Cl.
CPC ............. *G06N 3/082* (2013.01); *G06F 17/11* (2013.01); *G06N 3/04* (2013.01)

(58) Field of Classification Search
CPC .......... G06N 3/082; G06N 3/04; G06N 3/063; G06F 17/11
See application file for complete search history.

(56) References Cited

U.S. PATENT DOCUMENTS

| 6,243,490 | B1 | 6/2001 | Mita | |
|---|---|---|---|---|
| 9,268,529 | B2 * | 2/2016 | Willson, Jr. | .......... G06F 7/4818 |
| 2017/0103321 | A1 * | 4/2017 | Henry | .................. G06N 3/088 |
| 2018/0189640 | A1 * | 7/2018 | Henry | .................. G06F 9/3893 |
| 2018/0189651 | A1 * | 7/2018 | Henry | ....................... G06N 3/04 |

FOREIGN PATENT DOCUMENTS

| JP | H4-051384 A | 2/1992 |
|---|---|---|
| JP | H6-259585 A | 9/1994 |
| JP | 2006-155102 A | 6/2006 |

OTHER PUBLICATIONS

International Search Report with English translation and Written Opinion issued in corresponding application No. PCT/JP2017/000367 dated Mar. 21, 2017.

* cited by examiner

*Primary Examiner* — Brandon S Cole
(74) *Attorney, Agent, or Firm* — Foley & Lardner LLP

(57) ABSTRACT

The present invention addresses the problem of implementing a neural network using a small-scale circuit by simplifying the multiplication of the input data by weight data. The neural network circuit according to the present invention is configured from: a means for multiplying input data by a rounded value of the mantissa part of weight data; a means for shifting the multiplication result by the number of bits of the rounded value; a means for adding the shifted result to the original input data; and a means for shifting the addition result by the number of bits of the exponent part of the weight.

6 Claims, 5 Drawing Sheets

FIG. 2
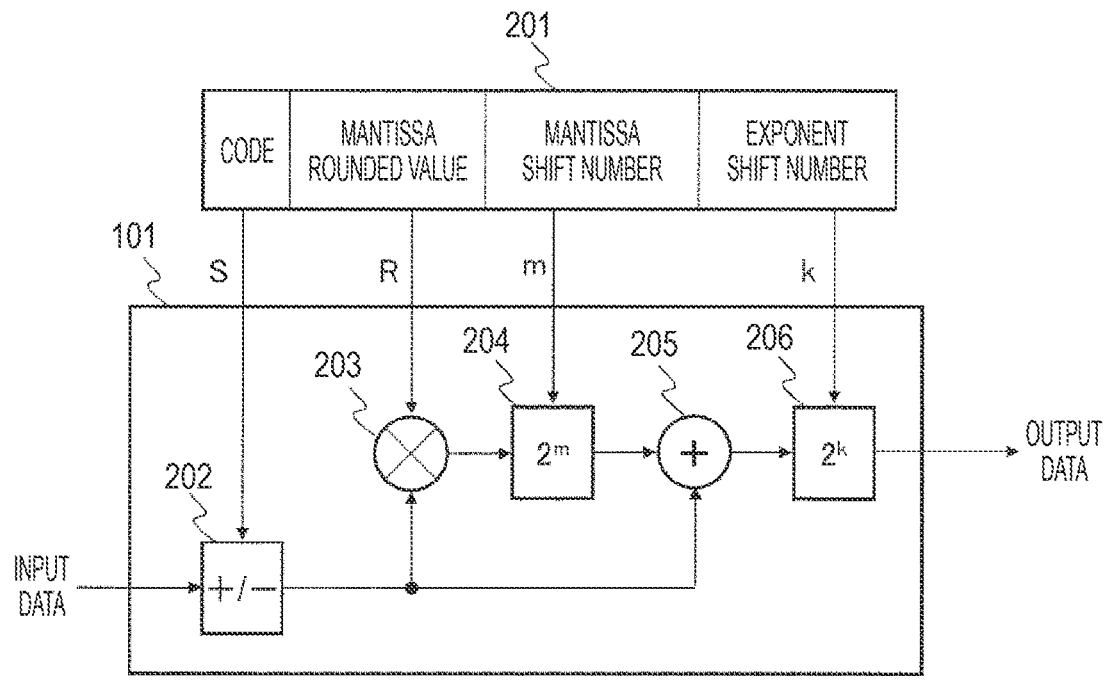
FIG. 3
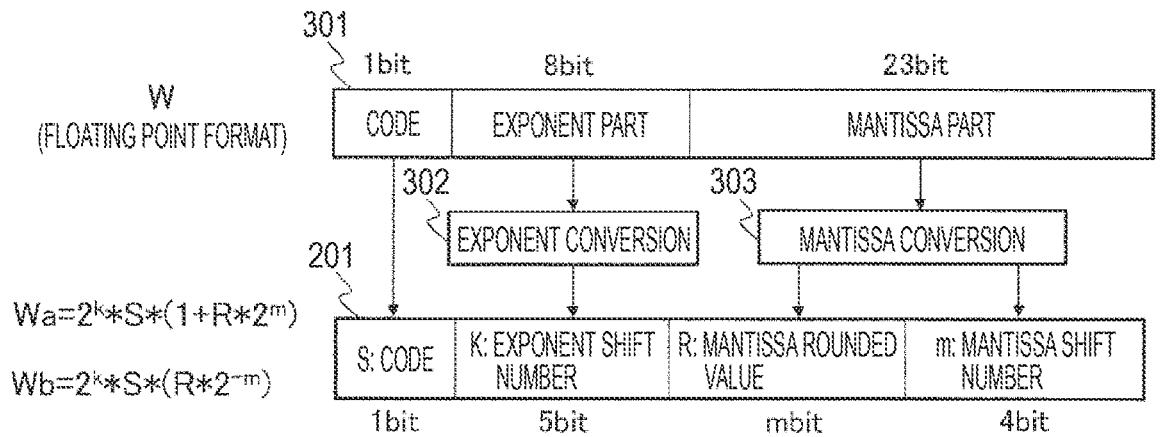
FIG. 4

FIG. 8
| W | Wb | FORMULA 1 |
|---|---|---|
| $2^0 \sim 0$ (SAME ON ONE SIDE) | 0.75 | $3*2^{-2}$ |
| | 0.5 | $2*2^{-2}$ |
| | 0.25 | $1*2^{-2}$ |
| | 0 | $0*2^{-2}$ |
801
| W | Wb | FORMULA 2 |
|---|---|---|
| $2^{-1} \sim 0$ (SAME ON ONE SIDE) | 0.375 | $2^{-1}*$FORMULA 1 |
| | 0.25 | |
| | 0.125 | |
| | 0 | |
802
| W | Wb | FORMULA 3 |
|---|---|---|
| $2^{-2} \sim 0$ (SAME ON ONE SIDE) | 0.1875 | $2^{-2}*$FORMULA 1 |
| | 0.125 | |
| | 0.0625 | |
| | 0 | |
803
FIG. 9
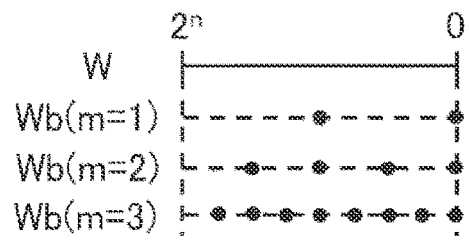
FIG. 10
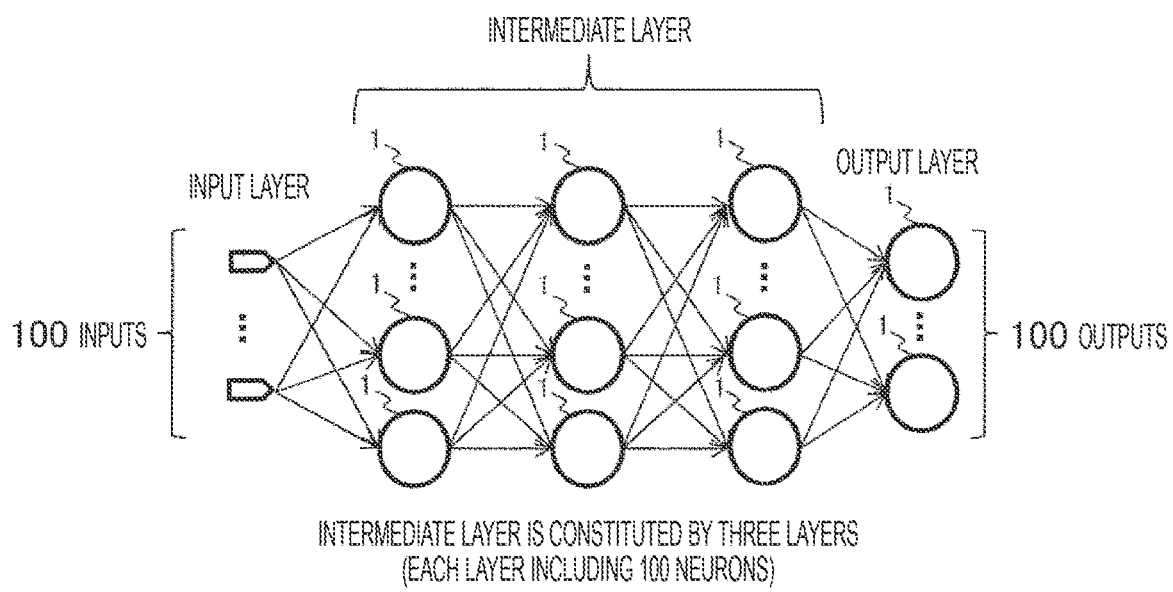
INTERMEDIATE LAYER IS CONSTITUTED BY THREE LAYERS
(EACH LAYER INCLUDING 100 NEURONS)

NEURAL NETWORK CIRCUIT PROVIDING FOR OPERATIONS WITH BIT SHIFTING AND ROUNDED VALUES OF WEIGHT INFORMATION

TECHNICAL FIELD

The present invention relates to a neural network circuit.

BACKGROUND ART

As a circuit configuration method of neurons in a neural network, a device as disclosed in JP H4-51384 A (PTL 1) is disclosed. In PTL 1, weight data is approximated by one power of two or a sum of a plurality of powers of two. Illustrated is an example in which a power-of-two operation is configured using a bit shift circuit, and results of the operation are added by an adder so that the multiplication of input data and weight data is approximated by a small-scale circuit.

CITATION LIST

Patent Literature

PTL 1: JP H4-51384 A

SUMMARY OF INVENTION

Technical Problem

There is a deep neural network as one method of machine learning. A neuron, which is a basic unit of the neural network, is configured to multiply a plurality of pieces of input data by corresponding weight factors, respectively, add the multiplication results, and output the addition result. Thus, in the case of implementation with a logic circuit such as an FPGA, a large number of multipliers are required so that an increase in circuit scale becomes a problem.

Therefore, a problem is to implement a neural network using a small-scale circuit by simplifying the multiplication of input data by weight data.

Solution to Problem

The present invention has been made in view of such circumstances. As an example, a neural network circuit according to the present invention is configured from: a means for multiplying input data by a rounded value of the mantissa part of weight data; a means for shifting the multiplication result by the number of bits of the rounded value; a means for adding the shifted result to the original input data; and a means for shifting the addition result by the number of bits of the exponent part of the weight.

Advantageous Effects of Invention

According to the present invention, it is possible to implement a neural network using a small-scale circuit by simplifying the multiplication of the input data by weight data.

BRIEF DESCRIPTION OF DRAWINGS

FIG. 2 is a block diagram illustrating a shift addition means in the embodiment.

FIG. 3 is a block diagram illustrating conversion of weight factors in the embodiment.

FIG. 4 is a table illustrating values of the weight factors in the embodiment.

FIG. 8 is a table illustrating values of weight factors in the embodiment.

FIG. 9 is a view illustrating the weight factors according to the mantissa shift number for a range of $2^n$ to 0 in the embodiment.

FIG. 10 is a block diagram illustrating an example of a general neural network circuit

DESCRIPTION OF EMBODIMENTS

Hereinafter, an embodiment of the present invention will be described with reference to FIGS. 1 to 11.

FIG. 10 is a block diagram of a neural network circuit on which the embodiment is mounted. As an example, a neural network that recognizes a character from an image of the character written manually. In FIG. 10, in an input layer, image data indicating gray values of a total of 100 pixels of 10 pixels×10 pixels in the vertical direction is input as 100 signals. Next, three intermediate layers are configured using 100 neurons 1 for each layer. An output of each neuron is input to the 100 neurons 1 of the next layer, and the 100 neurons 1 of an output layer finally output a recognition result.

For example, when an output of the neuron 1 at the top of the output layer is a character "A", it is configured to output a larger value than the neurons 1 of the other output layers. In addition, when an output of the second neuron 1 from the top is a character "B", it is configured to output a larger value than neurons in the other output layers. As described above, an identification result of the character is obtained depending on which number of neuron outputs the maximum value.

Figure 11:
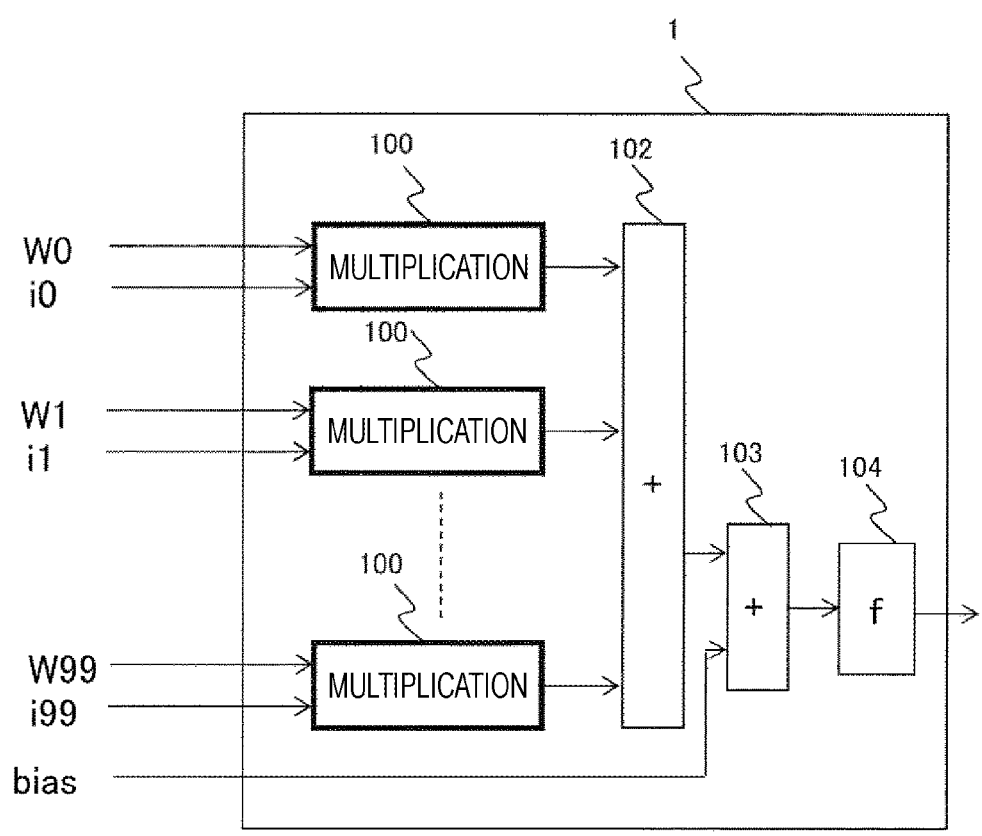
FIG. 11 is a block diagram illustrating an example of a conventional neuron.

FIG. 11 is a block diagram of a conventional general neuron 1. Multiplication 100 performs multiplication of an input in and a weight Wn. An adder 102 is a means for obtaining a sum of multiplication results of inputs i0 to i99 by the respective pieces of weight data. An adder 103 is a means for adding an output of the adder 102 and bias data. An output function 104 is a means for performing a certain function operation on an output value of the adder 103 and outputting the result.

For the purpose of processing the neural network circuit of FIG. 10 at high speed, the single neuron 1 requires 100 multipliers in the case of implementation with a logic circuit. Even when only one intermediate layer is subjected to the operation at one time, 100 neurons×100=10,000 multipliers are required. The number of bits of the weight W to be input to the multiplier 100 requires 8 bits, and the number of bits of image input data requires 8 bits in order to obtain high character recognition performance, and a circuit scale becomes enormous if these are implemented using the logic circuit.

Therefore, one purpose of the present embodiment is to implement a neural network circuit with a small-scale circuit while maintaining performance by performing such multiplication using an operation of a combination of addition and bit shift.

Figure 1:
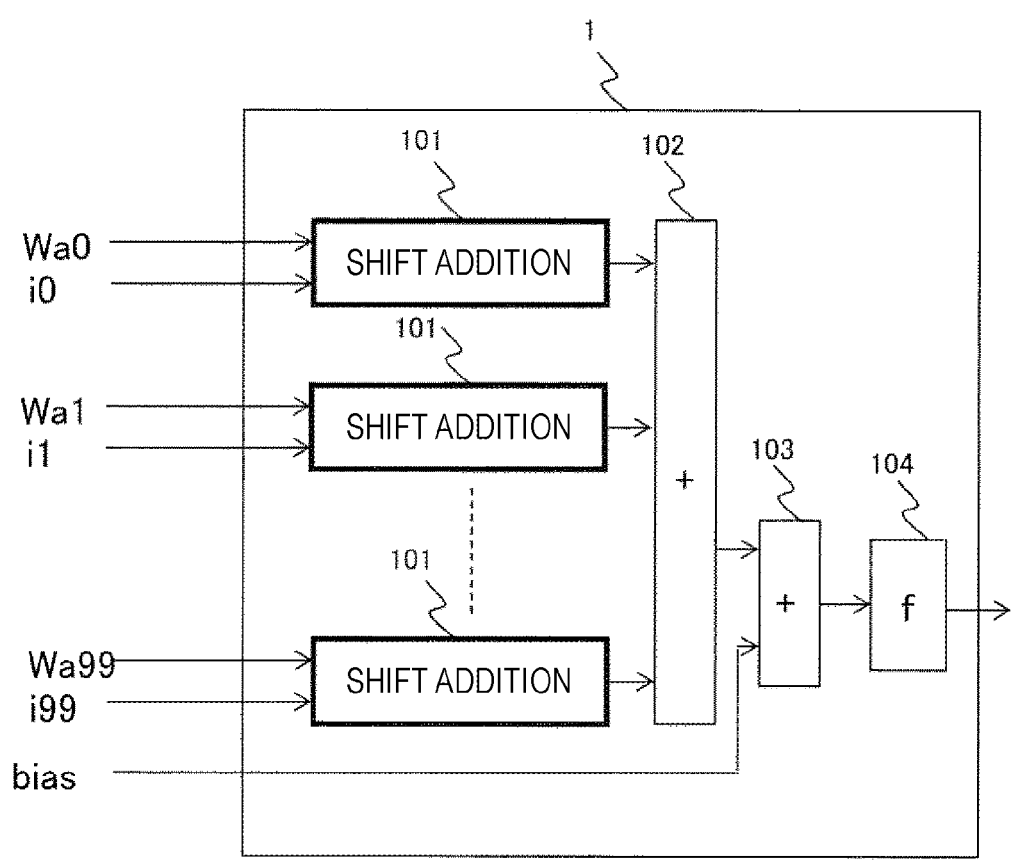
FIG. 1 is a block diagram illustrating a neuron in an embodiment.

FIG. 1 is a block diagram of a neuron in an embodiment. A shift addition 101 executes a multiplication operation of an input in and a weight factor Wa. Incidentally, details will be described later with reference to FIG. 2. An adder 102 is a means for obtaining a sum of shift addition results of inputs i0 to i99 by the respective weight factors. The adder 102 is a means for adding an output of the adder 102 and bias data. An output function 104 is a means for performing a certain function operation on an output value of the adder 103 and outputting the result.

FIG. 2 is a block diagram of a shift addition means in the embodiment. A weight factor storage unit 201 is a means for storing weight factors. The shift addition 101 obtains the weight factor Wa from (Formula a) $Wa=S*(1+R*2^{-m})*2^k$, and multiply the input in by the obtained weight factor Wa. Here, S indicates a positive or negative sign of a weight, and is 1 in the case of the positive sign and −1 in the case of the negative sign. Further, m is an integer of 0 or more and indicates accuracy of a weight factor, and has $2^m$ values in a range of $2^n$ to $2^{n+1}$. Details will be described later with reference to FIG. 5.

Figure 5:
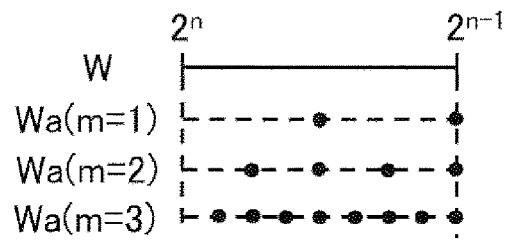
FIG. 5 is a view illustrating the weight factors according to a mantissa shift number for a range of $2^n$ to $2^{n-1}$ in the embodiment.

FIG. 5 is a view illustrating the weight factor Wa according to the number of mantissa shifts m in a range of $2^n$ to $2^{n-1}$. In the range of $2^n$ to $2^{n-1}$, the weight factor has two points when m=1, four points when m=2, and eight points when m=3. As described above, the number of points of the weight factors is $2^m$.

Next, in the above Formula a, R is a rounded value of a weight, and is an integer in a range of less than 0 and $R<2^m$. Further, K is a bit shift number corresponding to the exponent of weight and is an integer.

The shift addition 101 of FIG. 2 illustrates a specific implementation method of the above-described operation expression. A code conversion 202 is a function of converting the input in either positive or negative data. The input in is directly output if the code is 0, and the input in is multiplied by −1 and the multiplication result is output if the code is 1.

A multiplier 203 is a means for multiplying a mantissa rounded value which is an output from the weight factor storage unit 201.

A mantissa shift 204 is a means for bit-shifting an output of the multiplier 203 according to a mantissa shift number which is an output from the weight factor storage unit 201. If the mantissa shift number is a positive value, the shift is performed to the left. In addition, the shift is performed to the right if the mantissa shift number is a negative value.

An adder 205 is a means for adding an output of the mantissa shift 204 and an output of the code conversion 202.

The exponent shift 206 is a means for bit-shifting an output of the adder 205 according to an exponent shift number which is an output from the weight factor storage unit 201. If the exponent shift number is a positive value, the shift is performed to the left. In addition, the shift is performed to the right if the mantissa shift number is a negative value.

The weight factor according to the above Formula a is reliably applied from the time of first learning to obtain the weight factor of each neuron in the neural network of FIG. 10. Incidentally, learning to obtain a weight factor may be performed by a floating-point operation using a computer, and the obtained weight factor may be approximated to the weight factor obtained by the above formula so that the neural network may be implemented by a small-scale logic circuit as illustrated in FIG. 3.

FIG. 3 is a block diagram illustrating a correspondence between a conventional weight factor 301 described in a floating-point format and the weight factor 201 used for the shift addition processing of the present embodiment.

Although the present embodiment is directed to a fixed point operation, an example for easily obtaining the weight factor to be used for the shift addition processing from the weight factor of the floating-point format is illustrated. This example is advantageous in a case where, for example, learning to obtain a weight factor is performed by a floating-point operation using a computer, and the obtained weight factor is converted into the weight factor of the present invention so that a neural network is implemented by a small-scale logic circuit.

In the weight factor 201, the reference sign S is the same as the reference sign of the weight factor storage unit 301 in the floating-point format.

An exponent shift number K is generated by an exponent conversion 302 based on exponent part data of the weight factor storage unit 301. Specifically, a value of the exponent of the floating-point format is a value obtained by adding 127 as an offset. Therefore, a value obtained by subtracting 127 is set as the exponent shift number in 2's complement notation in the exponent conversion 302.

The mantissa rounded value R is generated by a mantissa conversion 303 based on mantissa part data of the weight factor storage unit 301. Specifically, the upper m bits of the mantissa part data are used as the mantissa rounded value.

The mantissa shift number m is generated by the mantissa conversion 303 based on mantissa part data of the weighting data 301. Specifically, the number of bits of the mantissa rounded value R is set as m.

FIG. 4 is a table illustrating an example of the weight factor. In the present embodiment, a formula to be calculated is determined depending on which range of powers of 2 the weight factor exists on the basis of the power of 2. A specific numerical example will be described hereinafter.

First, a table 401 illustrates values of the weight factor Wa in the case where a weight range W is in a range of 2 to 1 and the mantissa shift number m=2, and Formula 1 to obtain the values. According to Formula 1, a value of R can take four integer values from 0 to 3, and thus, the weight factor Wa takes four values from 1.0 to 1.75 by an increment of 0.25.

Next, a table 402 illustrates values of a weight approximate value Wa in the case where the weight range W is in a range of 1.0 to 0.5 and the mantissa shift number m=2, and Formula 2 to obtain the values. Formula 1 is multiplied by $2^{-1}$ by setting the exponent shift number K=−1, thereby obtaining the result of Formula 2.

Next, a table 403 illustrates values of the weight factor Wa in the case where the weight range W is in a range of 0.5 to 0.25 and the mantissa shift numbers m=2, and Formula 3 to obtain the values. Formula 1 is multiplied by $2^{-2}$ by setting the exponent shift number K=−2, thereby obtaining the result of Formula 3.

As described above, a feature of the present embodiment is that the bit shift is performed according to the range of powers of 2 including the weight factor based on the weight factor value obtained by Formula 1 so that the weight value is not rounded to 0 although being a value close to 0.

Figure 6:
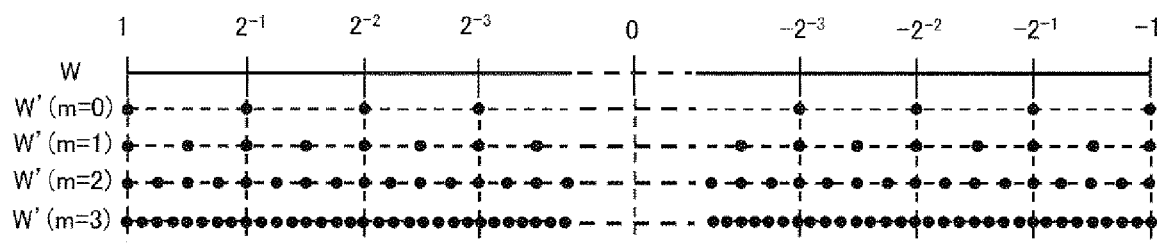
FIG. 6 is a view illustrating the weight factors according to the mantissa shift number for a range of weights from 1 to −1 in the embodiment.

FIG. 6 is a view illustrating the weight factor Wa according to the mantissa shift number m in the range of 1.0 to −1.0. Since the number of weight factors is always constant in the range of $2^n$ to $2^{n-1}$, the weight factor is not rounded to 0 although being a value close to 0, and the multiplication with input data can be performed with high accuracy.

Figure 7:
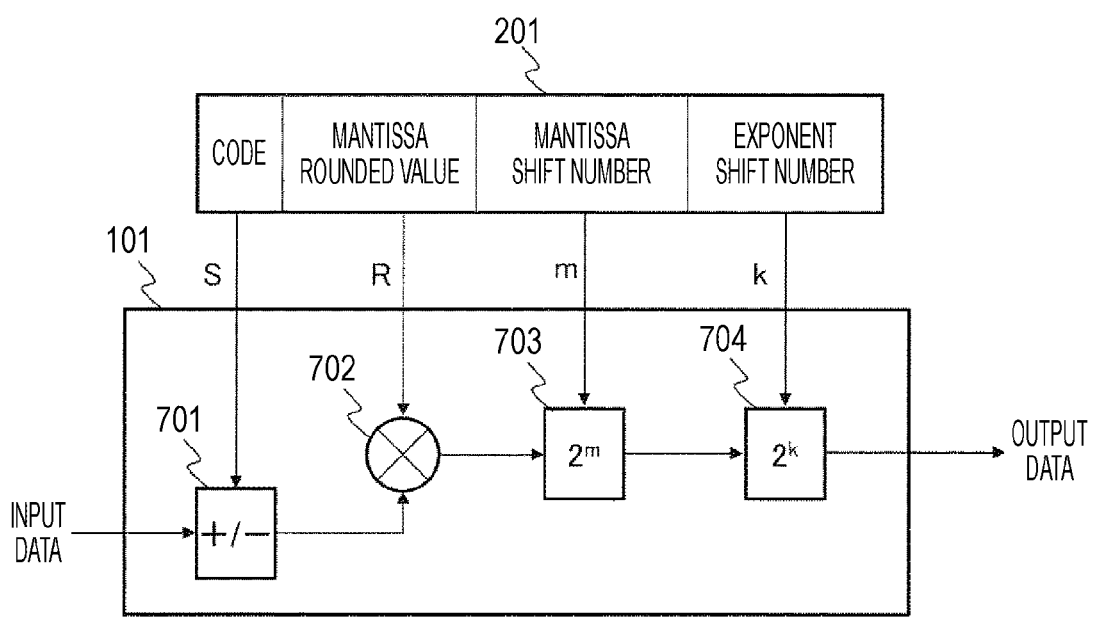
FIG. 7 is a block diagram illustrating a shift addition means in an embodiment.

FIG. 7 is a block diagram of a shift addition means according to another embodiment. A weight factor storage unit 201 is a means for storing weight factor values. A shift addition 101 obtains a weight factor value Wb for an input in from (Formula b) $Wb=S*R*2^{-m}*2^k$, and multiply the input in by the obtained weight factor value Wb. Here, S indicates a positive or negative sign of a weight, and is 1 in the case of the positive sign and −1 in the case of the negative sign. Further, m is an integer of 0 or more and indicates accuracy of a weight factor, and has $2^m$ weight factors in a range of $2^n$ to 0. Details will be described later with reference to FIG. 9.

FIG. 9 is a view illustrating the weight factor Wb according to a mantissa shift number m with respect to the weight factors in the range of $2^n$ to 0. In the range of $2^n$ to 0, there are two points when m=1, four points when m=2, and eight points when m=3. As described above, the number of points of the weight factors is $2^m$.

Next, in the above Formula b, R is a rounded value of a weight, and is an integer in a range of $0 \leq R < 2^m$.

Further, K is a bit shift number corresponding to the exponent of weight and is an integer. A shift addition 101 of FIG. 7 illustrates a specific implementation method of the above-described operation expression.

A code conversion 701 is a function of converting input data into either positive or negative data. The input data is directly output if the code is 0, and the input data is multiplied by −1 and the multiplication result is output if the code is 1.

A multiplier 702 is a means for multiplying a mantissa rounded value which is an output from the weight factor storage unit 201.

A mantissa shift 703 is a means for bit-shifting an output of the multiplier 702 according to a mantissa shift number which is an output from the weight factor storage unit 201. If the mantissa shift number is a positive value, the shift is performed to the left. In addition, the shift is performed to the right if the mantissa shift number is a negative value.

An exponent shift 704 is a means for bit-shifting an output from the mantissa shift 703 according to an exponent shift number. If the exponent shift number is a positive value, the shift is performed to the left. In addition, the shift is performed to the right if the mantissa shift number is a negative value.

The weight factor according to the above Formula b is reliably applied from the time of first learning to obtain the weight factor of each neuron in the neural network of FIG. 10. Incidentally, learning to obtain a weight factor may be performed by a floating-point operation using a computer, and the obtained weight factor may be approximated to the weight factor obtained by the above formula so that the neural network may be implemented by a small-scale logic circuit as illustrated in FIG. 3.

FIG. 8 is a table illustrating an example of the weight factor in FIG. 7.

In the present embodiment, a formula to be calculated is determined depending on which range of powers of 2 including a weight value on the basis of the power of 2. A specific numerical example will be described hereinafter.

First, a table 801 illustrates values of the weight factor Wb in the case where a weight range W is in a range of 1 to 0 and the mantissa shift number m=2, and Formula 1 to obtain the values. According to Formula 1, a value of R can take four integer values from 0 to 3, and thus, the weight factor Wb takes four values from 1 to 0 by an increment of 0.25.

Next, a table 802 illustrates values of the weight factor Wb in the case where the weight range W is in a range of 0.5 to 0 and the mantissa shift numbers m=2, and Formula 2 to obtain the values. Formula 1 is multiplied by $2^{-1}$ by setting the exponent shift number K=−1, thereby obtaining the result of Formula 2.

Next, a table 803 illustrates values of the weight factor Wb in the case where the weight range W is in a range of 0.25 to 0 and the mantissa shift numbers m=2, and Formula 3 to obtain the values. Formula 1 is multiplied by $2^{-2}$ by setting the exponent shift number K=−2, thereby obtaining the result of Formula 3.

As described above, a feature of the present embodiment is that the bit shift is performed according to the range of powers of 2 including the weight factor based on the weight factor obtained by Formula 1 so that the weight value is not rounded to 0 although being a value close to 0.

According to the respective embodiments described above, it is possible to make the number of weight factor values in the range of $2^n$ to $2^{n-1}$ constant, to prevent a small weight factor value from being rounded to 0, and to implement the neural network with the small-scale circuit while maintaining the performance. In addition, the circuit system is generalized and it is easy to adjust the performance and the circuit scale in accordance with an application target of the DNN.

Although the embodiments of the present invention have been described above, the present invention is not limited to the above-described respective embodiments, and includes various modifications. For example, a part of each of the embodiments can be added, converted, deleted, or the like within a range where the effects of the present invention are exhibited. In addition, it is possible to replace a part of each of the embodiments.

That is, the above-described embodiments have been described in detail in order to facilitate the understanding of the present invention, and are not necessarily limited to one including the above-described configuration thereof.

REFERENCE SIGNS LIST 1 neuron
100 multiplier
101 shift addition
102 adder
103 adder
104 output function
201 weight factor storage unit of present invention
202 code conversion
203 multiplier
204 bit shifter
205 adder
206 bit shifter
301 weight factor storage unit of floating-point format
401 to 403 weight factor table
701 code conversion
702 multiplier
703 bit shifter
704 bit shifter
801 to 803 weight factor table

The invention claimed is:

1. A neural network circuit comprising computer circuitry for providing a plurality of weight factors corresponding to a plurality of pieces of input data as information indicating a weight rounded value and an amount of bit shift and performing a weighting operation on the input data by multiplication with the weight rounded value and the bit shift, in neurons constituting a neural network, wherein the computer circuitry is configured to learn to obtain a weight factor of the plurality of weight factors using a floating-point operation, wherein the obtained weight factor is approximated to a weight factor obtained by the calculation $Wa=S*(1+R*2-m)*2k$, where S is a positive or negative sign of a weight, Wa is the weight factor, R is a rounded value of a weight and is an integer in a range of less than 0 and $R<2^m$, and k is a bit shift number corresponding to the exponent of weight and is an integer.

2. The neural network circuit according to claim 1, wherein in the neurons constituting the neural network, a value after the weighting operation on the input data is a result of the multiplication with the weight rounded value and the bit shift.

3. The neural network circuit according to claim 1, wherein the computer circuitry is structured to convert the input data to the information indicating the weight rounded value and the amount of bit shift.

4. The neural network circuit according to claim 1, wherein the weight factors, obtained by an operation in which the number of the weight factors is constant in a range between $2^n$ and $2^{n-1}$, are provided.

5. The neural network circuit according to claim 1, wherein the weight factors, obtained by an operation in which the number of the weight factors is constant in a range between $2^n$ and 0, are provided.

6. A neural network circuit comprising:

computer circuitry configured to
multiply input data by a rounded value of a mantissa part of weight data;
shift the multiplication result by the number of bits of the rounded value;
add the shifted result to the original input data; and
shift the addition result by the number of bits of an exponent part of the weight, wherein the computer circuitry is configured to learn to obtain a weight factor for the weight data using a floating-point operation, wherein the obtained weight factor is approximated to a weight factor obtained by the calculation $Wa=S*(1+R*2^{-m})*2^k$, where S is a positive or negative sign of a weight, Wa is the weight factor, R is a rounded value of a weight and is an integer in a range of less than 0 and $R<2^m$, and k is a bit shift number corresponding to the exponent of weight and is an integer.

* * * * *